Feb. 28, 1933.　　　　J. BALTON　　　　1,899,302
WAFER BAKING MACHINE
Filed Dec. 10, 1931　　　9 Sheets-Sheet 7

Inventor
James Balton.
By Albert E. Dieterich
Attorney

Patented Feb. 28, 1933

1,899,302

UNITED STATES PATENT OFFICE

JAMES BALTON, OF BALTIMORE, MARYLAND, ASSIGNOR TO JOSEPH SHAPIRO, OF BALTIMORE, MARYLAND

WAFER BAKING MACHINE

Application filed December 10, 1931. Serial No. 580,167.

My present invention relates to the art of baking, and especially to the baking of pastry wafers In baking pastry wafers it has long been the practice to bake them between flat plates which are sometimes hinged together at one end and usually are provided with locking devices for holding them together while the batter, placed between the plates, is baking. Machines have hereofore been devised for baking wafer sheets (see, for example, Letters Patent No. 967,147, August 10, 1910, to Trewick, and Patent No. 990,577, April 25, 1911, to Mayle et al.), but all machines which have heretofore been brought to my attention are relatively slow in operation, take up considerable floor space, require one or more attendants, particularly to insure the removal of the baked wafers from the plates and prevent clogging of the machine, thus limiting the efficiency of the machine. It is therefore an object of my invention to provide a machine which will not only take up little floor space, but will be wholly automatic throughout its entire cycle of operation, will require no constant attendant, and will be one whose operating efficiency is so high as to effect a very material reduction in the cost of manufacturing wafers.

Further, it is an object to provide a wafer baking machine, wholly automatic, which is simple in construction, low in first cost, and whose maintenance charges are at a minimum.

Again, it is an object to provide a wafer baking machine using a ferris wheel type carrier for the baking units and so to mount the units on the carrier that they may be removed and replaced with little loss of time, should replacement become necessary either in case of repairs or for the purpose of changing the design of the wafer to be made.

Further, it is an object to provide a wafer baking machine of such construction that the baked wafers will always adhere to the same wafer plate in each unit, thereby avoiding a hit-and-miss adhesion of the wafers to the plates and by providing such uniformity of action allow the use of mechanical means for removing the wafers from the plates of the units and subsequently from the machine.

Further, it is an object to provide each baking unit with means to extract or peel the wafer sheet from the plate to which it most tenaciously adheres, and in order to insure the proper action of the extractor it is a further object of the invention to provide the extractor with means for effecting a mechanical interlocking of the extractor and the wafer during the baking process and during the earlier stages of the separation of the plates of the units (opening the units).

Other objects will in part be obvious and in part be pointed out hereinafter.

To the attainment of the aforesaid objects and ends the invention includes those novel combinations, construction of mechanisms and cooperative relationship of parts which will hereinafter be first described and then specifically pointed out in the appended claims, reference being had to the accompanying drawings in which:—

Figure 2 is a front elevation of the lower right-hand (90 degree) portion of the machine; Figures 1 and 2 may be read together as one by joining the vertical lines x—x.

Figure 3 is a rear elevation of that portion of the machine which is shown in Figure 2.

In the drawings in which like numerals and letters of reference designate like parts in all the figures:

1 represents the main supporting frame castings located on the base or leg castings 2 to which they are rigidly secured. The main supporting frame castings 1 are provided with bearings 3 for the shaft of the rotatable wheel and the castings 1 also carry the hood supporting sub-frame 4.

The rotatable wheel 5 is of approximately E-shape in vertical cross-section and consists of a hub with spokes 6—6$x$ radiating therefrom. To the extreme ends of the spokes cross T-bars 7 are secured. These bars have rear-end plates 8 bolted to the spokes 6, as at 9. They also have front-end plates 10, the front-end plates of adjacent T-bars being connected by bridge plates 11 secured to the front-end plates 10 by cap screws 12.

The wheel has gear teeth 13 by which it is driven through suitable power transmitting mechanism from the motor 80. The general construction of the main frame, the rotatable wheel and the power transmitting mechanism, as well as that of the batter charging mechanism 79, may be of the same general construction as the corresponding parts of the machine disclosed in my Letters Patent No. 1,772,450, issued August 12, 1930, so a further detailed description of the foregoing parts is believed to be unnecessary here.

The T-bars 7 adjacent the rear-end plates 8 are provided with U-shape sockets 14 to receive the hinge of the baking plate units. The hinge pins are retained removably in the U-shaped sockets 14 by means of plates 15 secured to the T-bars by cap screws 16 in such manner that by loosening the screws the plates 15 may be turned to open the sockets for the reception or removal of the hinge pins in placing or removing the units from the wheel.

The top surface 17 of each T-bar 7 is preferably convex. To this convex surface of each T-bar is secured a pair of batter-trimming blades 18 running lengthwise of the T-bars and having slots through which the fastening screws 19 pass so that the blades may be adjusted to and from each other.

20 designates the lower (outer) baking plate of a unit. It is provided with a suitable area 21 of filagree design (grooves and ridges). The plate 20 has side recesses 22 for the stripper bars which are held in the recesses against lateral displacement by removable side plates 23 secured at 24 to the plate 20.

25 is the stripper fork, there being one for each plate 20. The fork is pivotally mounted on pivot screws 26 and includes a pair of stripper bars 27 which lie in the recesses 22 hereinbefore referred to. The stripper bars are designed to lie with their exposed edges in the plane of the face of the filagree work, while the side plates 23 project very slightly beyond that plane.

Each stripper bar 27 has its exposed edge provided with hook-like or under-cut notches 28 at suitable intervals to interlock with the wafers.

Each stripper fork carries a stripper operating cam engaging roller 29.

The upper (inner) baking plate 30 also is provided with side strips 31 which register with the plates 23 when the baking plates 20 and 30 are closed together. The side strips 31 are secured to the plates 30 by screws 32.

The plates 20 and 30 are hinged together by means of ears 33 and 34 on the lower and upper plates respectively and the hinge pin 83 which has its ends projected into the sockets 14.

The lower baking plate 20 of each unit carries a roller 35 at the front which is mounted on the plate by screw studs 36.

The upper baking plate of each unit also has a front stud 37 on which a lock 38 is pivoted. This lock has a locking finger 39 which carries adjustable locking screw and jam nut 40. Each lock 38 carries a locking roller 41, an unlocking roller 42 and is provided with a counterweight 43 which slightly overbalances the weight of the locking roller and the locking finger, thus facilitating the unlocking act when the unit is traveling past the unlocking stage (below the axis of the wheel) and also assists in maintaining the locked relation while passing through the baking oven (above the axis of the wheel).

44 designates the baking plate locking cam track section which carries the locking cam 45 and an additional safety locking cam 46 the latter insuring complete locking in the event that the cam 45 fails to function properly. The locking cam track section 44 is preferably pivoted at 48 and at its advance end (the end remote from the pivot) is provided with a buffer spring device 47 which will yield when excessive pressure is encountered, thereby preventing breaking of the locks and associated parts should one become displaced and fail properly to function.

An overhead rest track 49 is provided for supporting the front ends of the baking plate units in passing through the oven hood. The after end 50 of the overhead track 49 is braced at 51 and carries the plate unlocking cam 52. It is also provided with a cutaway portion 57 to allow the shearing cam 58 to function.

59 designates the advance supporting track for the baking units at their front ends. This track extends about 90 degrees in the lower left-hand quarter of the machine when viewed from the front.

60 indicates the final supporting track for the lower baking units' front ends and it is braced at 61.

63 designates the cam tracks for lowering the lower baking plate (unit opening) and raising the same again (unit closing). These tracks 63 constitute a part of the discharging mechanism. They are suitably supported by brackets 64 and 65.

66 indicates the stripper operating cam, 67 the stripper returning primary cam and 68 the stripper returning final cam, the latter being in the nature of a safety device and being mounted on a pivoted arm 69, pivoted at 70 at one end and supported at the other end by a buffer spring device 71.

The upper (inner) baking plate of each unit has a plate-lifting fork 72 which straddles the adjacent spoke 6x and projects to the rear side of the machine where it carries a roller 73 that cooperates with a cam track 74 whose function is to depress the roller 73 and cause the upper baking plate to be elevated for the purpose of permitting the introduction of batter-charging mechanism.

75 is a safety track to prevent the roller 73 from jumping away from the track 74.

76 and 77 designate the lowering cams for the upper baking plate which function after the units have been charged with batter.

The cam 77 has an extension 78 for holding the upper plate against opening up too far under steam and batter expansion pressure until the upper and lower plates shall have been locked.

81 is a suitable take-off conveyor on which the wafers are deposited by the stripper action and by which conveyor the baked wafers are removed from the machine.

From the foregoing it will be observed that in order to remove or replace a baking unit it is only necessary to loosen the plates 15, swing them from the sockets 14 and disconnect the fork 72, whereupon the baking unit may be bodily lifted out from the wheel in its entirety. There being no spokes or other obstruction at the front of the wheel it is very easy for the mechanic to move and replace a unit.

Figure 1:
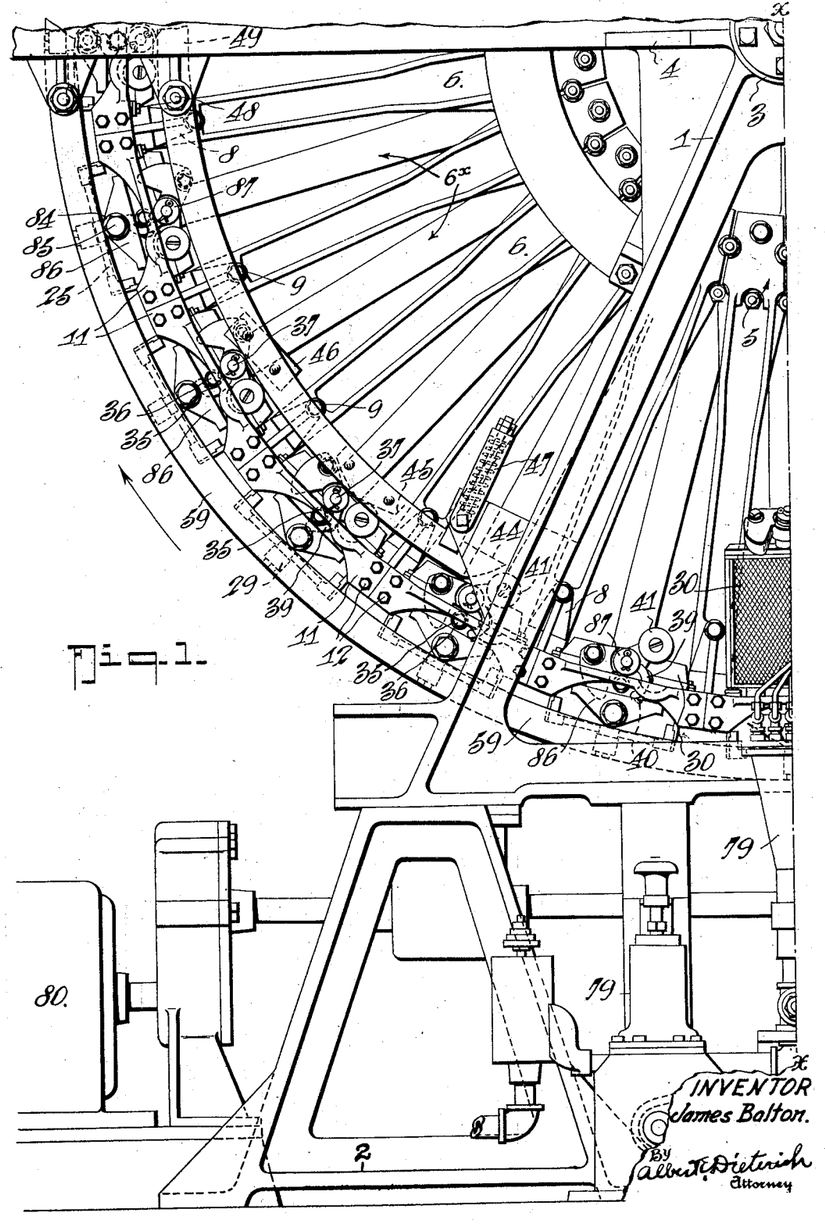
Figure 1 is a front elevation of the lower left-hand (90 degree) portion of the machine.
Figure 2:
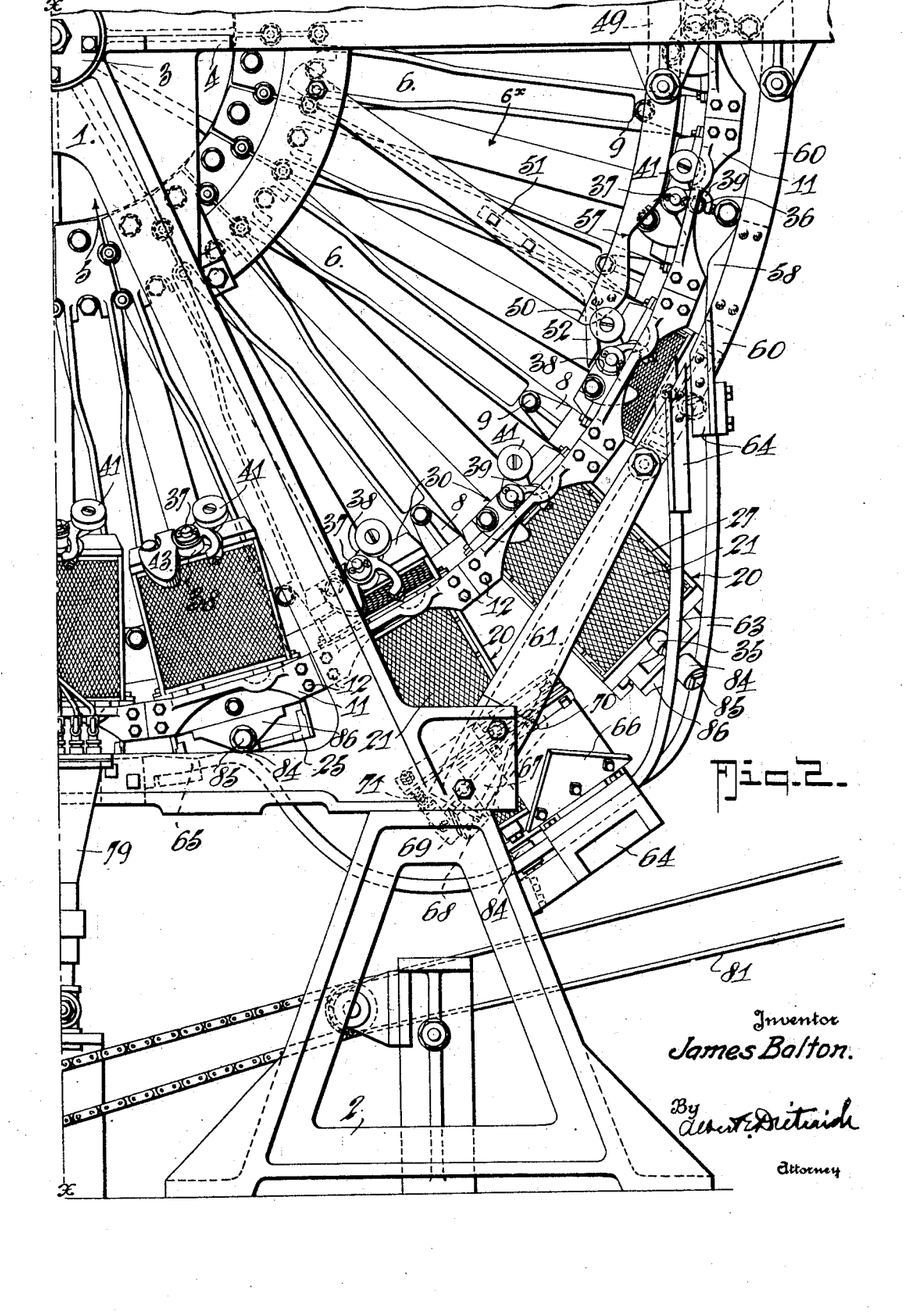
Figure 4:
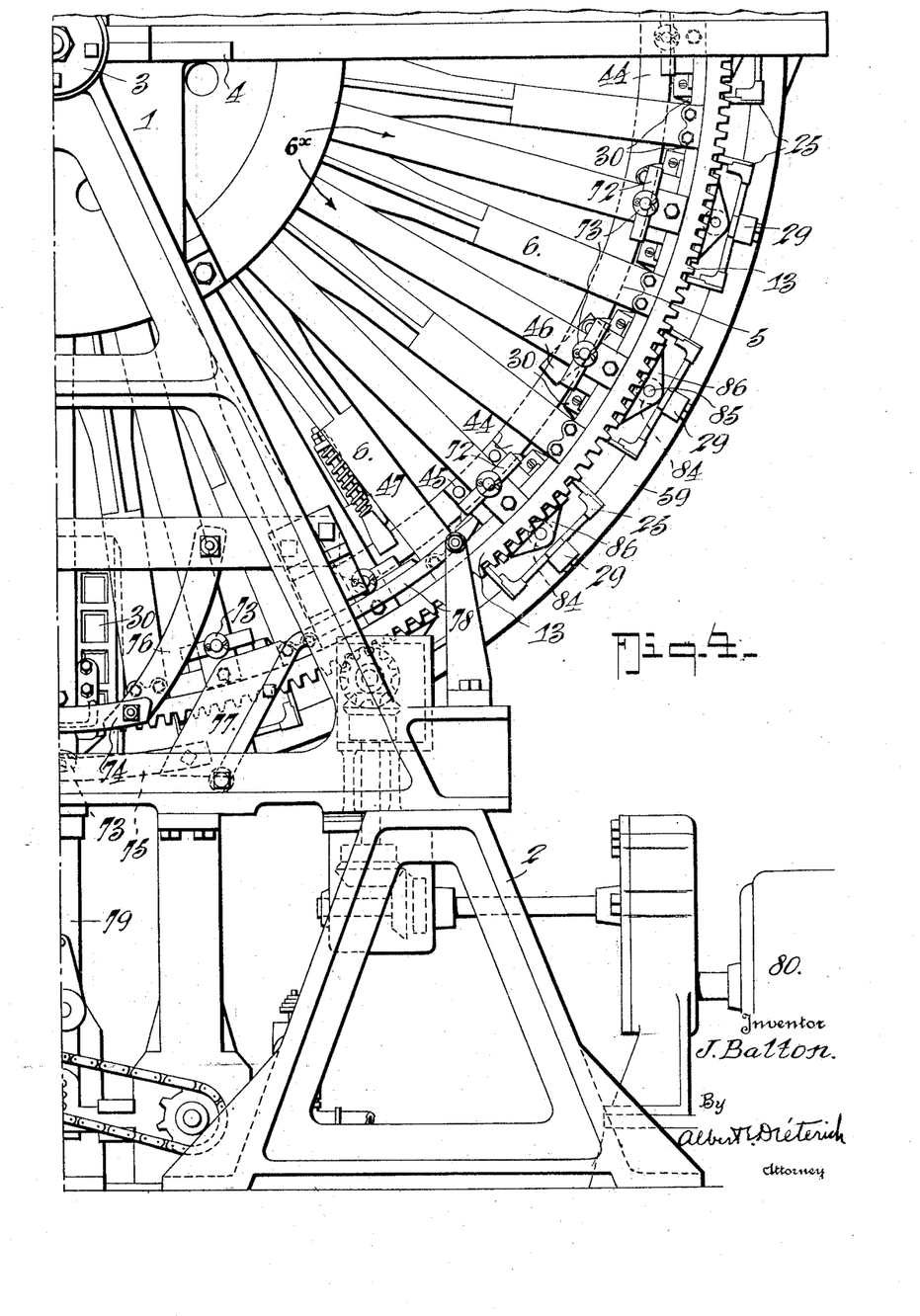
Figure 4 is a rear elevation of that portion of the machine which is shown in Figure 1.
Figure 5:
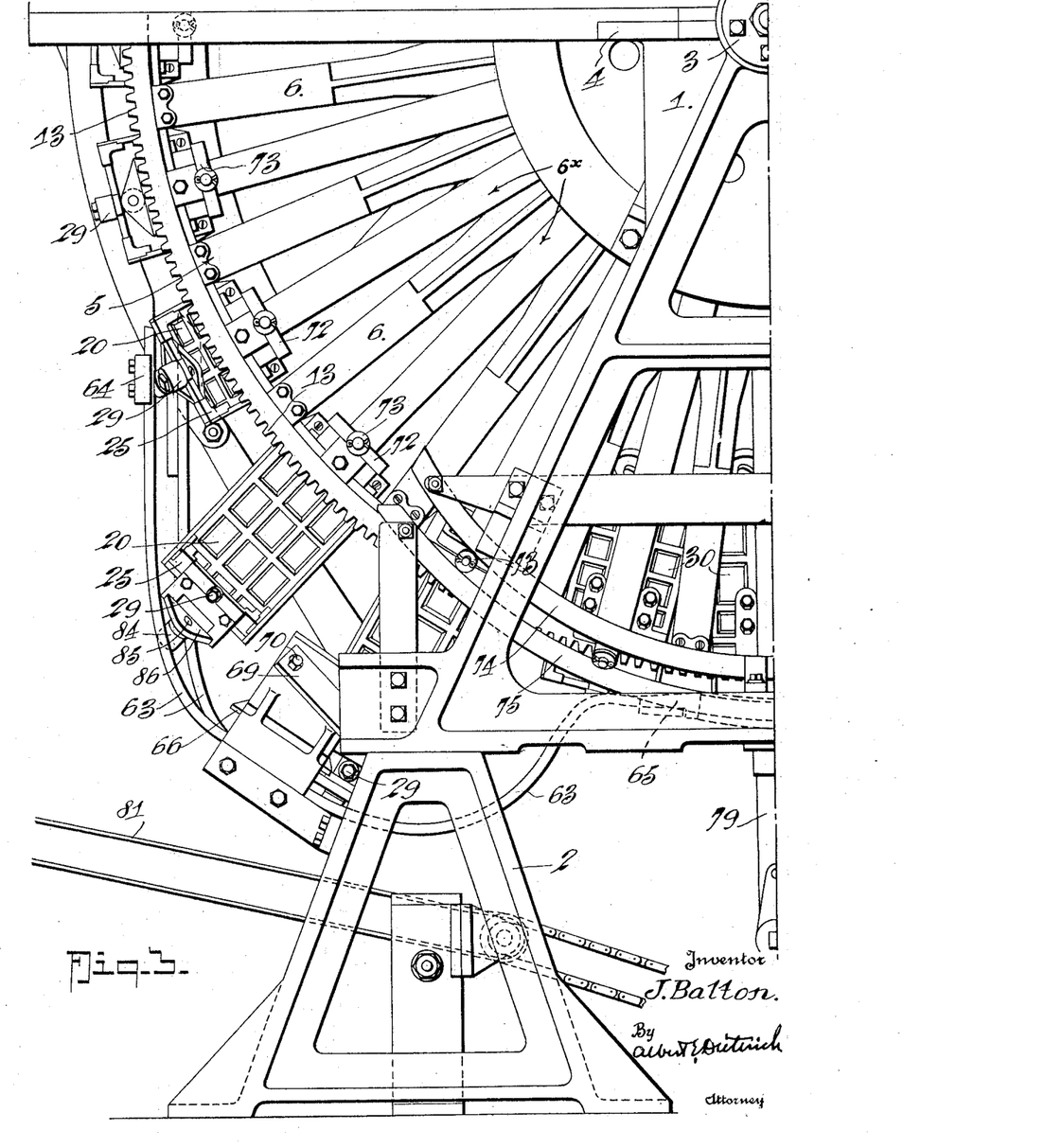
Figure 5 is an enlarged detail front elevation of a portion of the machine.
Figure 6:
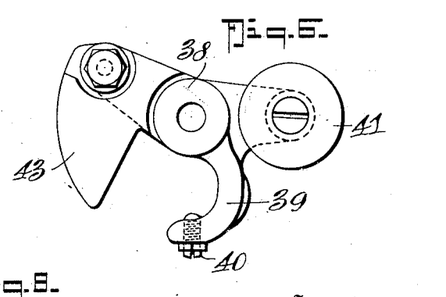
Figure 6 is a front elevation of one of the plate locks.
Figure 7:
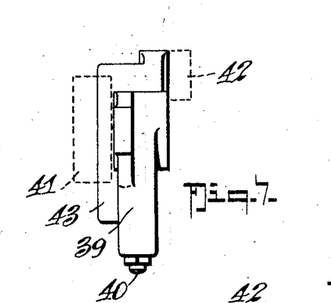
Figure 7 is a side elevation of the plate lock, the rollers being shown in dotted lines.
Figure 8:
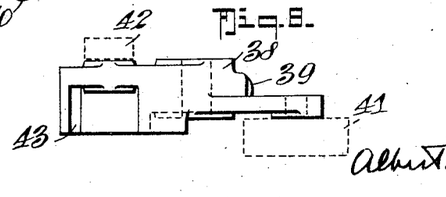
Figure 8 is a plan of the lock, the rollers being shown in dotted lines.
Figures 9, 14:
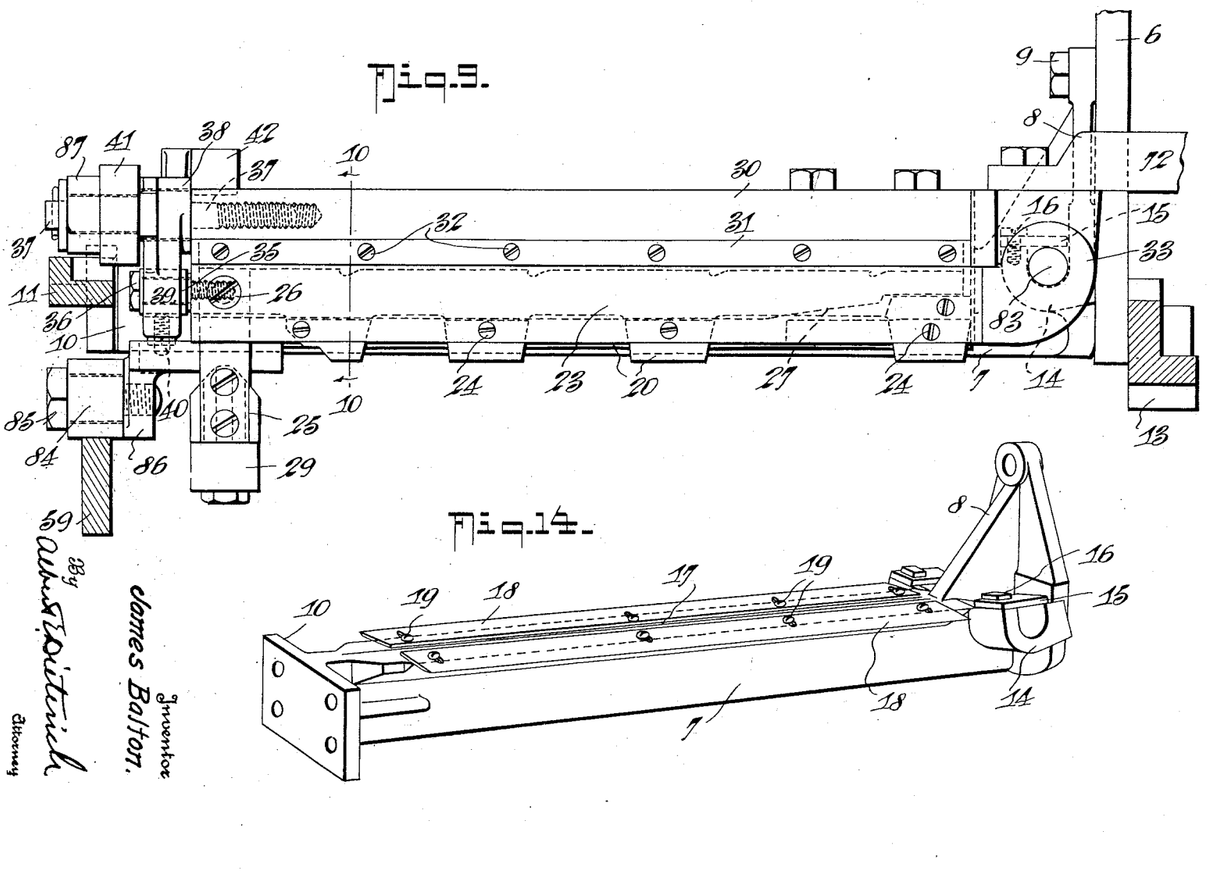
Figure 9 is a detail section taken substantially on the line 9—9 of Figure 5.
Figure 14 is a perspective view of a T-bar.
Figure 10:
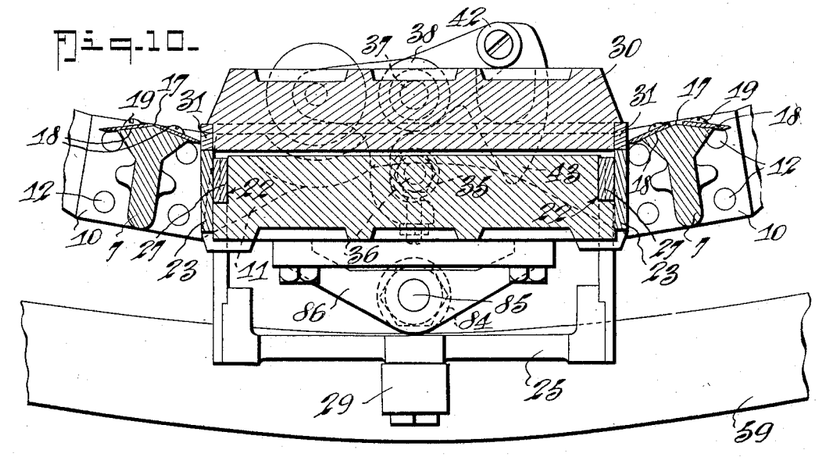
Figure 10 is a cross-section of a baking unit taken substantially on the line 10—10 of Figure 9.

The machine passes through the following cycle of operation, to wit:

The upper baking plate of the unit in the lower-most position in Figures 1 and 2 having been raised through the action of the cam track 74, a charge of batter is squirted onto the lower plate. Continuing rotation of the wheel moves this unit in a clockwise direction in Figure 1. Having been charged with batter, the upper baking plate of the unit is lowered through the action of the cams 76 and 77, after which the lock 38 has its roller 41 brought into engagement with the locking cam 45 which forces the lock to bring its finger 39 under the roller 35 on the front of the lower baking plate and thus lock the plates together. They then pass around through the oven hood and down the right-hand side of the machine. In passing from the baking chamber downwardly the shearing cam 58 first comes into action to rock the unit on its axis in the sockets 14, thereby causing the batter trimming blades 18 to shear off the exuded batter from the sides of the baking unit. Continuing its travel, the unlocking cam 52 is engaged by the unlocking roller 42, thus causing the lock 38 to be turned to bring its locking finger 39 out of engagement with the roller 35.

On passing from the unlocking cam the roller 84 (mounted on a stud 85 carried by a bracket 86 on the front of the lower mold plate) is engaged by the cam tracks 63 and the lower plate of the unit is dropped, while the front roller 87 of the upper unit rests on the bridge plate 11. As it approaches the approximate vertical position the roller 29 of the stripper fork will be engaged by the stripper operating cam 66 to cause the stripper to operate to eject and trim off the baked wafers from the lower baking plate.

Continued movement of the wheel causes the roller 29 to be engaged by the cam 67 which returns the stripper into the baking plate grooves. Continued movement of the wheel causes the track 63 to restore the lower baking plate of the unit to the horizontal position again and into proximity with the upper plate of the unit.

Figures 11, 15, 16:
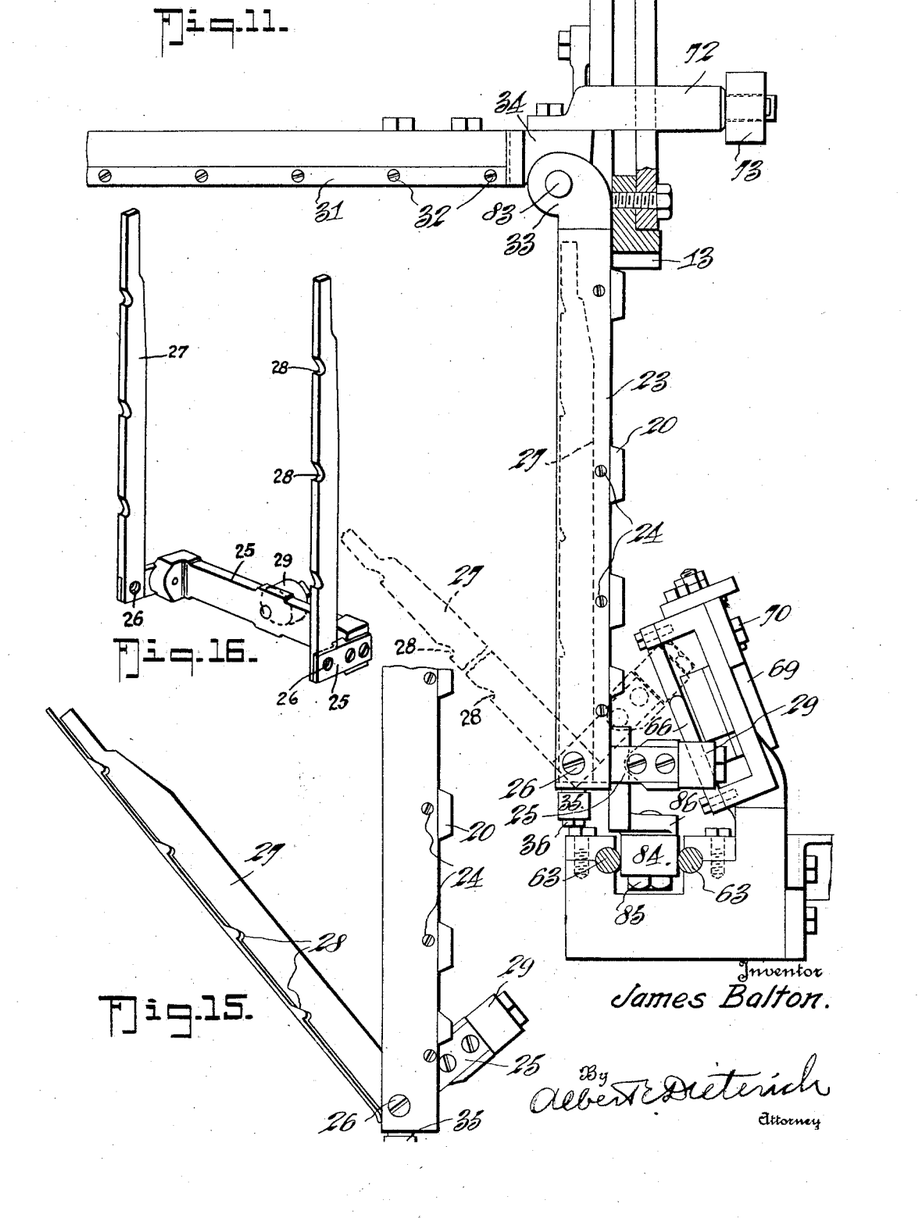
Figure 11 is a side elevation of a baking plate unit in the discharging position just before the stripper bar has been actuated by the cam 66, the stripper being shown in discharging position in dotted lines.
Figure 15 is a diagrammatic view illustrating the action of the stripper bars, showing the cooperative relation of notches and the lower baking plate during the act of stripping.
Figure 16 is a detail perspective view, on a small scale, of the stripper fork.
Figure 12:
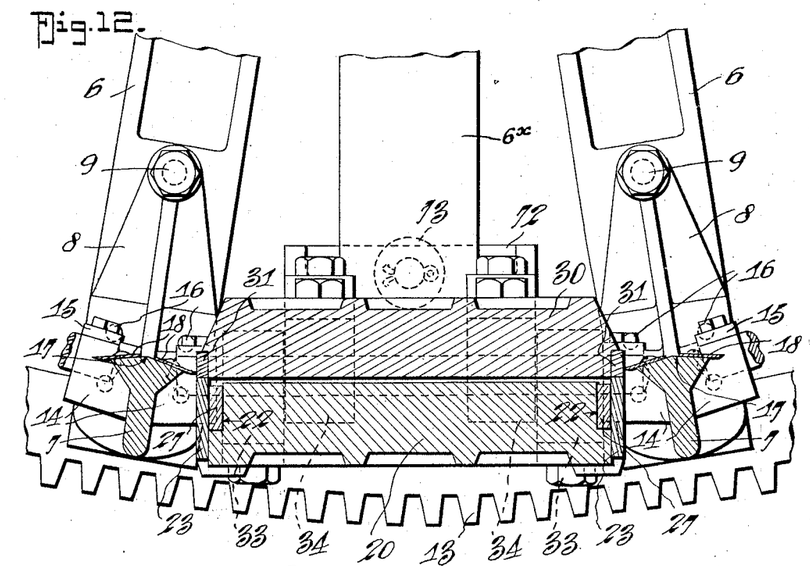
Figure 12 is an enlarged cross-section through two cross T-bars and the baking unit located between them.
Figure 13:
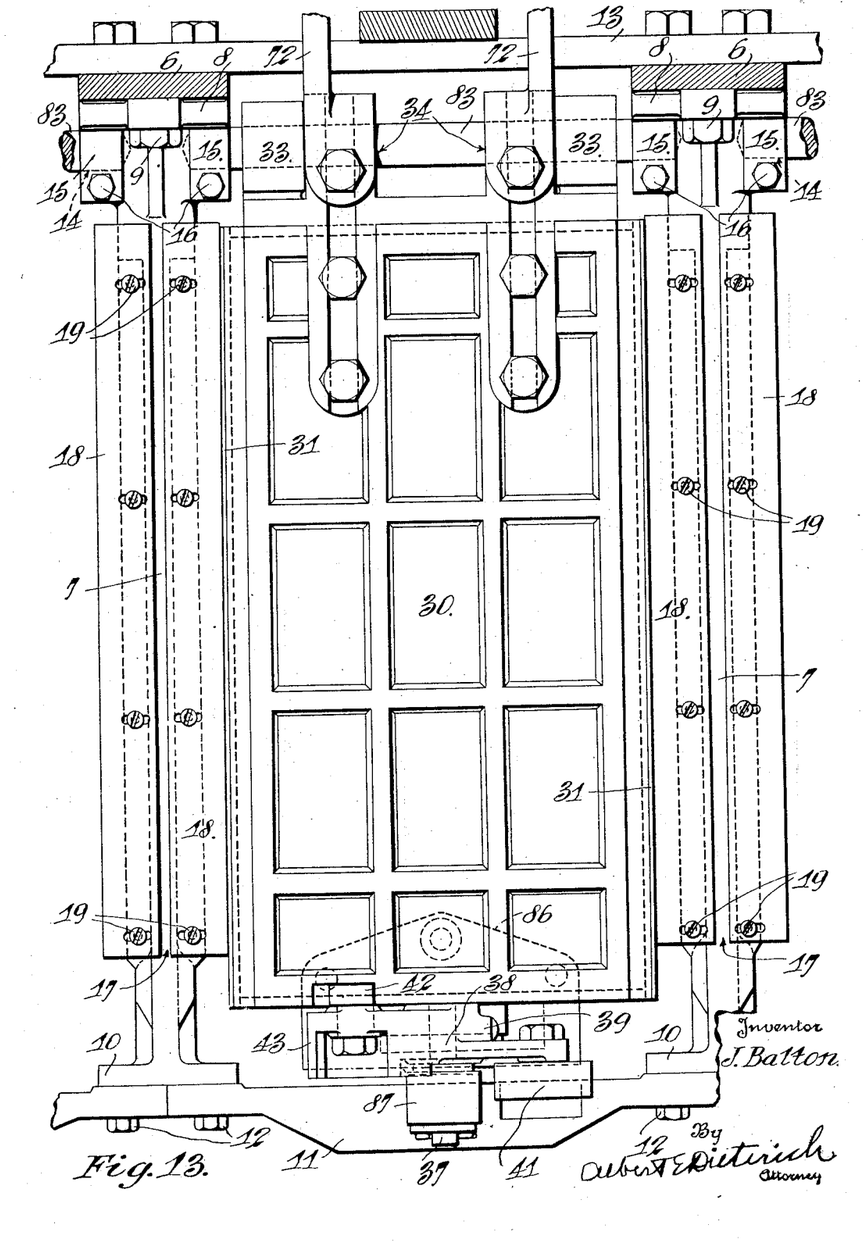
Figure 13 is a plan thereof.
Figure 17:
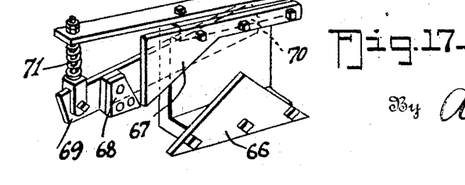
Figure 17 is a perspective view of the cams 66—71 on their supporting plate, a part of the plate being broken away.

Continued movement in a clockwise direction (Figures 1 and 2) brings the roller 73 into engagement with the cam tracks 74 again to raise the upper baking plate and thus complete the cycle of operation. It will be noted by reference to the diagrammatic Figure 15 that since the stripper is pivoted at the front end of the lower baking plate it will throw the wafer downwardly onto the off-take conveyor 81. Further, since the pivot of the stripper is below the baking surface of the lower baking plate, it is obvious that the stripping of the wafer will occur adjacent to the hinge axis of the baking plates first, or at any rate the stripping movement will be more rapid at that place than at the front end of the baking plates. Consequently there is a sliding motion that takes place between the baked wafer and the stripper bars, the motion being relatively such that in effect the wafer moves toward the free ends of the stripper bars. As the notches of the stripper bars open upwardly and toward the free ends, it consequently follows that the baked material which is mechanically interlocked with the stripper bars is automatically disengaged therefrom, thus freeing the wafer from the stripper bars at the same time that the stripper bars free the wafer from the baking plate surface.

From the foregoing description, taken in connection with the accompanying drawings, it is thought that the complete construction, operation and advantages of the invention will be clear to those skilled in the art to which it appertains. While I have herein described and illustrated in the drawings the preferred embodiment of my invention, it must be obvious to any one skilled in the art that changes in details of construction, form and arrangement of parts may readily be made without departing from the spirit of the invention defined by the following claims.

What I claim is:—

1. In wafer baking machines, an endless carrier, a set of baking units mounted thereon and each comprising an upper and a lower baking plate hinged together, means to open said plates apart and close them together again, means to deposit batter between the opened plates, means to heat said plates, and means to release the baked wafers from the baking surfaces of the plates and discharge the baked wafers from between the opened plates.

2. In wafer baking machines, an endless carrier, a set of baking units mounted thereon and each comprising an upper and a lower baking plate hinged together, means to open said plates apart and close them together again, means to deposit batter between the opened plates, means to heat said plates, and means to release the baked wafers from the baking surfaces of the plates and discharge the baked wafers from between the opened plates, said discharging means including a wafer stripping device for each unit and cam tracks to actuate said stripping devices.

3. In wafer baking machines, an endless carrier, a set of baking units mounted thereon and each comprising an upper and a lower baking plate hinged together, means to open said plates apart and close them together again, means to deposit batter between the opened plates, means to heat said plates, and means to discharge the baked wafers from between the opened plates, said discharging means including a wafer stripping device for each unit and cam tracks to actuate said stripping devices, said stripping devices each including provisions for interlocking with the baked wafers to hold them to one of the baking plates of each unit until the other plate of that unit has freed itself from the wafer.

4. In wafer baking machines, an endless carrier, a set of baking units mounted thereon, each unit comprising an upper and a lower baking plate hinged together, means to open said plates apart and close them together again, means to deposit batter between the opened plates, means to heat said plates, means to cut the overflow of baked batter from the baking units before they open up, and means to discharge the baked wafers from between the opened plates.

5. In wafer baking machines, an endless carrier, a set of baking units mounted thereon, each unit comprising an upper and a lower baking plate hinged together, means to open said plates apart and close them together again, means to deposit batter between the opened plates, means to heat said plates, means to cut the overflow of baked batter from the baking units before they open up, and means to discharge the baked wafers from between the opened plates, said cutting means comprising stationarily held blades mounted on the carrier, and means for moving the units as such to cause the blades to remove the surplus baked product from the plates.

6. In wafer baking machines, an endless carrier, a set of baking units mounted thereon, each unit comprising an upper and a lower baking plate hinged together, means to open said plates apart and close them together again, means to deposit batter between the opened plates, means to heat said plates, means to cut the overflow of baked batter from the baking units before they open up, and means to discharge the baked wafers from between the opened plates, said cutting means comprising stationarily held blades mounted on the carrier, and means for moving the units as such to cause the blades to remove the surplus baked product from the plates, said discharging means including a wafer stripping device for each baking unit and a cam track located at a fixed place in the path of travel of the carrier for actuating said stripping device.

7. In wafer baking machines, a rotatable wheel, a set of baking units carried by said wheel and each comprising two baking plates hinged together at one end, a lock at the other end securing the plates of the units together in baking relationship, means to actuate said locking means and securing and releasing the plates of the units at predetermined intervals, cam tracks for separating and bringing together the plates of the respective units while they are unlocked, means to deposit batter between the separated plates and to remove the baked wafers from between the same at predetermined intervals, means to heat the units for baking, means causing the baked wafers to adhere more tenaciously to one plate of the units than to the other, by virtue of which, when the units open up, the baked wafers will lie uniformly in the units, and means to strip the baked wafers from the plates to which they have adhered more tenaciously and eject the wafers from the machine, and means to trim overflow batter from the plates of the units before the units open up.

8. In wafer baking machines, wherein a set of baking units is caused to travel through an endless path; a baking unit comprising a pair of baking plates hinged together at one end, the opposing faces of said plates being provided with indentations, the indentations of one plate being of greater magnitude than those of the other plate, by virtue of which the baked wafers will be caused to adhere the more tenaciously to one plate than to the other, and means on the one plate for stripping the baked wafers therefrom when the plates have been separated, said stripping means comprising stripper bars hinged at one end to said one plate with one edge of the bar exposed, means for pivoting said bars to said one plate and means to move said bars on their pivots out of said one plate to strip the baked wafers from that plate.

9. In wafer baking machines, wherein a set of baking units is caused to travel through an endless path; a baking unit comprising a pair of baking plates hinged together at one end, the opposing faces of said plates being provided with indentations, the indentations of one plate being of greater magnitude than those of the other plate, by virtue of which the baked wafers will be caused to adhere the more tenaciously to one plate than to the other, and means on the one plate for stripping the baked wafers therefrom when the plates have been separated, said stripping means comprising stripper bars in said one plate along the longitudinal sides thereof, said bars having one edge exposed, means for pivoting said bars at one end to said one plate, and means to move said bars on their pivots to strip the baked wafers from said one plate.

10. In wafer baking machines, wherein a set of baking units is caused to travel through an endless path; a baking unit comprising a pair of baking plates hinged together at one end, the opposing faces of said plates being provided with indentations, the indentations of one plate being of greater magnitude than those of the other plate, by virtue of which the baked wafers will be caused to adhere the more tenaciously to one plate than to the other, and means on the one plate for stripping the baked wafers therefrom when the plates have been separated, and means to cause the baked wafers to adhere to the stripping means while said stripping means is inactive and to be released therefrom when said stripping means is in action.

11. In wafer baking machines, wherein a set of baking units is caused to travel through an endless path; a baking unit comprising a pair of baking plates hinged together at one end, the opposing faces of said plates being provided with indentations, the indentations of one plate being of greater magnitude than those of the other plate, by virtue of which the baked wafers will be caused to adhere the more tenaciously to one plate than to the other, and means on the one plate for stripping the baked wafers therefrom when the plates have been separated, said stripping means comprising stripper bars hinged at one end to said one plate with one edge of the bars exposed, means for pivoting said bars at one end to said one plate and means to move said bars on their pivots out of said one plate to strip the baked wafers from that plate, and means to cause the baked wafers to adhere to the stripping means while said stripping means is inactive.

12. In wafer baking machines, wherein a set of baking units is caused to travel through an endless path; a baking unit comprising a pair of baking plates hinged together at one end, the opposing faces of said plates being provided with indentations, the indentations of one plate being of greater magnitude than those of the other plate, by virtue of which the baked wafers will be caused to adhere the more tenaciously to the one plate than to the other, and means on the one plate for stripping the baked wafers therefrom when the plates have been separated, said stripping means comprising stripper bars hinged to said one plate with one edge of the bar exposed, means for pivoting the said bars to said one plate and means to move said bars on their pivots out of said one plate to strip the baked wafers from that plate, and means to cause the baked wafers to adhere to the stripping means while said stripping means is inactive, said last named means comprising undercut notches in the exposed edges of said bars so formed and related to the pivots of said bars that upon raising the bars out of the plates the baked wafers will be disengaged from the notches and stripped from the adjacent baking plate.

13. A vertically rotatable wheel having a hub and spokes and turning on a horizontal axis, a set of wafer baking units mounted at the periphery of said wheel and lying transversely of the spokes, each of said units comprising an inner and an outer plate hinged together adjacent said spokes and pivotally mounted as a unit on said wheel, locks for the free ends of said plates, burners to heat said units during their travel with the wheel, means to actuate said locks alternately to secure and release said plates, plate stripping knife blades on the wheel adjacent each unit, cam tracks cooperating with the free ends of said units and including a portion to rock the units on their pivotal axes to cause said blades to shear the overflow batter from the units, said cam tracks also including a portion for moving the outer plate of a unit on its hinge axis away from the inner plate thereof, and means cooperatively associated with said outer plate of the unit for separating the wafer therefrom and discharging it from the unit.

14. In wafer baking apparatus, two flat plates hinged together at one end and having a definite area of their opposing faces serrated, a fork pivoted to one of said plates and including a pair of bars, one located adjacent each side of the plate for stripping the wafer from that plate, and means by which the fork may be manipulated for the purpose stated, the pivotal axis of said fork lying at the end of the plate opposite the hinge axis of the plate.

15. In wafer baking apparatus, two flat plates hinged together at one end and having a definite area of their opposing faces serrated, a fork pivoted to one of said plates and including a pair of bars, one located adjacent each side of the plate for stripping the wafer from that plate, and means by which the fork may be manipulated for the purpose stated, the pivotal axis of said fork lying at the end of the plate opposite the hinge axis of the plate, and that plate having the fork being grooved to receive the bars of the fork, leaving one edge of each bar exposed.

16. In wafer baking apparatus, two flat plates hinged together at one end and having a definite area of their opposing faces serrated, a fork pivoted to one of said plates and including a pair of bars, one located adjacent each side of the plate for stripping the wafer from that plate, and means by which the fork may be manipulated for the purpose stated, the pivotal axis of said fork lying at the end of the plate opposite the hinge axis of the plate, and that plate having the fork being grooved to receive the bars of the fork, leaving one edge of each bar exposed, the exposed edges of the bars having notches for interlocking with the wafer, the notches being so formed as to be self-releasing as the fork is raised out of said groove in stripping the wafer from the plate.

17. In wafer baking machines, an endless ferris-wheel type carrier, a set of baking units mounted thereon, each unit comprising an upper and a lower baking plate, means to open said plates apart and close them together again as they move through the lower arc of their circular path of travel, means to deposit batter between the opened plates, means to heat said plates, means to cut the overflow of baked batter from the baking units before they open up, and means to detach the baked wafers from the plates and discharge the wafers from between the opened plates and from the machine.

18. In wafer baking machines, an endless carrier, a set of baking units mounted thereon, each unit comprising an upper and a lower baking plate, means to open said plates apart and close them together again, means to deposit batter between the opened plates, means to heat said plates, means to cut the overflow of baked batter from the baking units before they open up, and means to discharge the baked wafers from between the opened plates, said cutting means comprising stationarily held blades mounted on the carrier, and means for moving the units as such to cause the blades to remove the surplus baked product from the plates.

JAMES BALTON.